Figure 1:
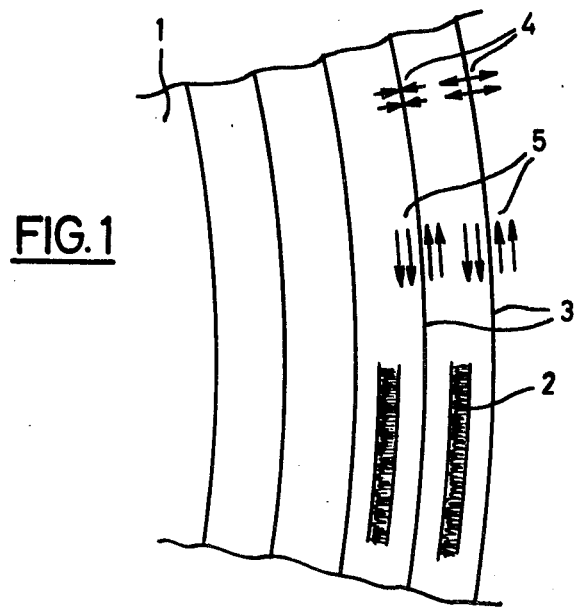

United States Patent [19]

Hack et al.

[11] 4,157,576
[45] Jun. 5, 1979

[54] TRACK-DEPENDENT TRANSDUCER POSITION CONTROL IN MAGNETO-DYNAMIC STORAGE DEVICES, AND A MAGNETIC RECORDING MEDIUM TO WHICH THIS METHOD IS APPLICABLE

[75] Inventors: Joachim Hack, Ludwigshafen; Karl Uhl, Frankenthal, both of Fed. Rep. of Germany

[73] Assignee: BASF Aktiengesellschaft, Ludwigshafen, Fed. Rep. of Germany

[21] Appl. No.: 821,205

[22] Filed: Aug. 2, 1977

Related U.S. Application Data

[63] Continuation-in-part of Ser. No. 605,412, Aug. 18, 1975, abandoned.

[30] Foreign Application Priority Data

Aug. 17, 1974 [DE] Fed. Rep. of Germany ....... 2439546

[51] Int. Cl.² ............................ G11B 21/10; G11B 5/56
[52] U.S. Cl. ...................................... 360/77; 360/107
[58] Field of Search .....:............................. 360/77-78, 360/86, 107, 97-98, 135, 70, 76

[56] References Cited

U.S. PATENT DOCUMENTS

| 3,126,535 | 3/1964 | Streeter | 360/107 |
|---|---|---|---|
| 3,246,307 | 4/1966 | Stanley | 360/77 |
| 3,263,031 | 7/1966 | Welsh | 360/77 |
| 3,404,392 | 10/1968 | Sordello | 360/77 |
| 3,614,756 | 10/1971 | McIntosh et al. | 360/77 |
| 3,812,533 | 5/1974 | Kimura et al. | 360/77 |
| 3,821,804 | 6/1974 | Stevenson et al. | 360/77 |
| 3,840,893 | 10/1974 | Jacoby et al. | 360/77 |
| 3,893,180 | 7/1975 | Braun et al. | 360/77 |

FOREIGN PATENT DOCUMENTS 49-84617 8/1974 Japan.

*Primary Examiner*—Alfred H. Eddleman
*Attorney, Agent, or Firm*—Keil & Witherspoon

[57] ABSTRACT

The invention concerns a system for recording and/or reproducing data signals on a magnetic recording medium, more particularly a new improved transducer locating system. The magnetic transducer is provided with an air gap for the data track and a second air gap for the reference track which latter is formed on a recording medium as a transition line between regions of varying magnetization and arranged within, or laterally of, the data track. As the transducer deviates from its desired track position, a correction signal is produced which is fed to a locating device to which the transducer is fitted, in order to adjust the position of the transducer.

21 Claims, 29 Drawing Figures

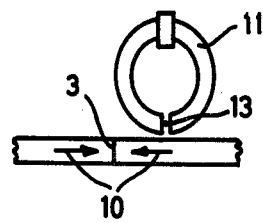 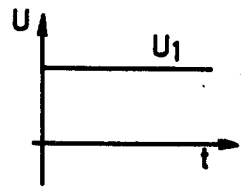 FIG.3a
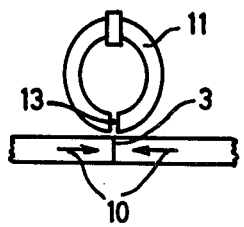 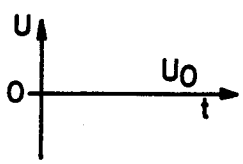 FIG.3b
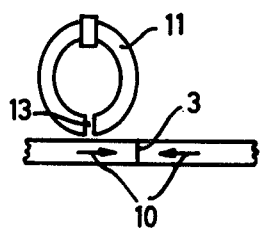 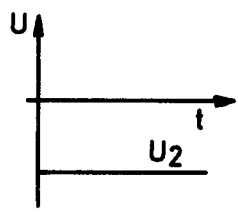 FIG.3c

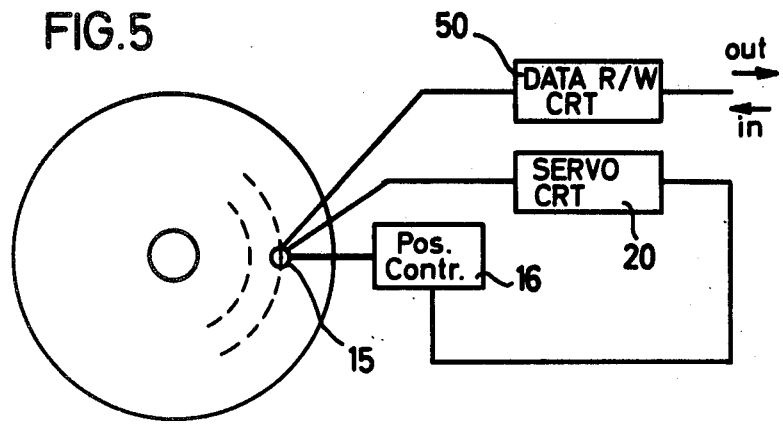
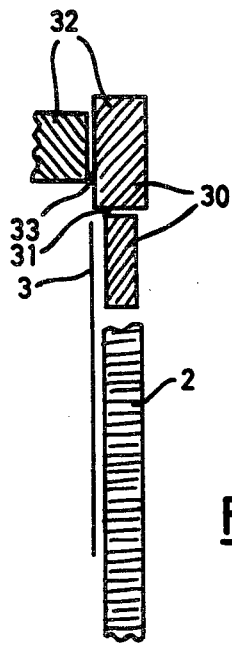
FIG.8
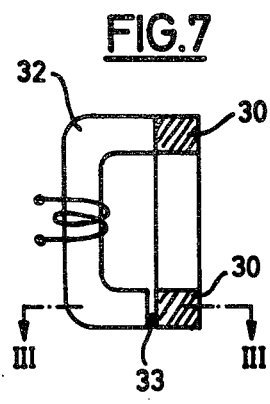
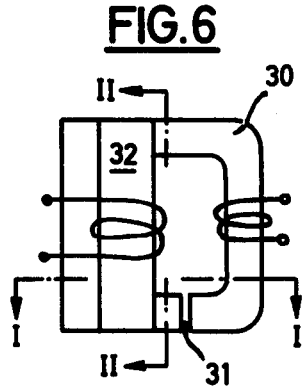

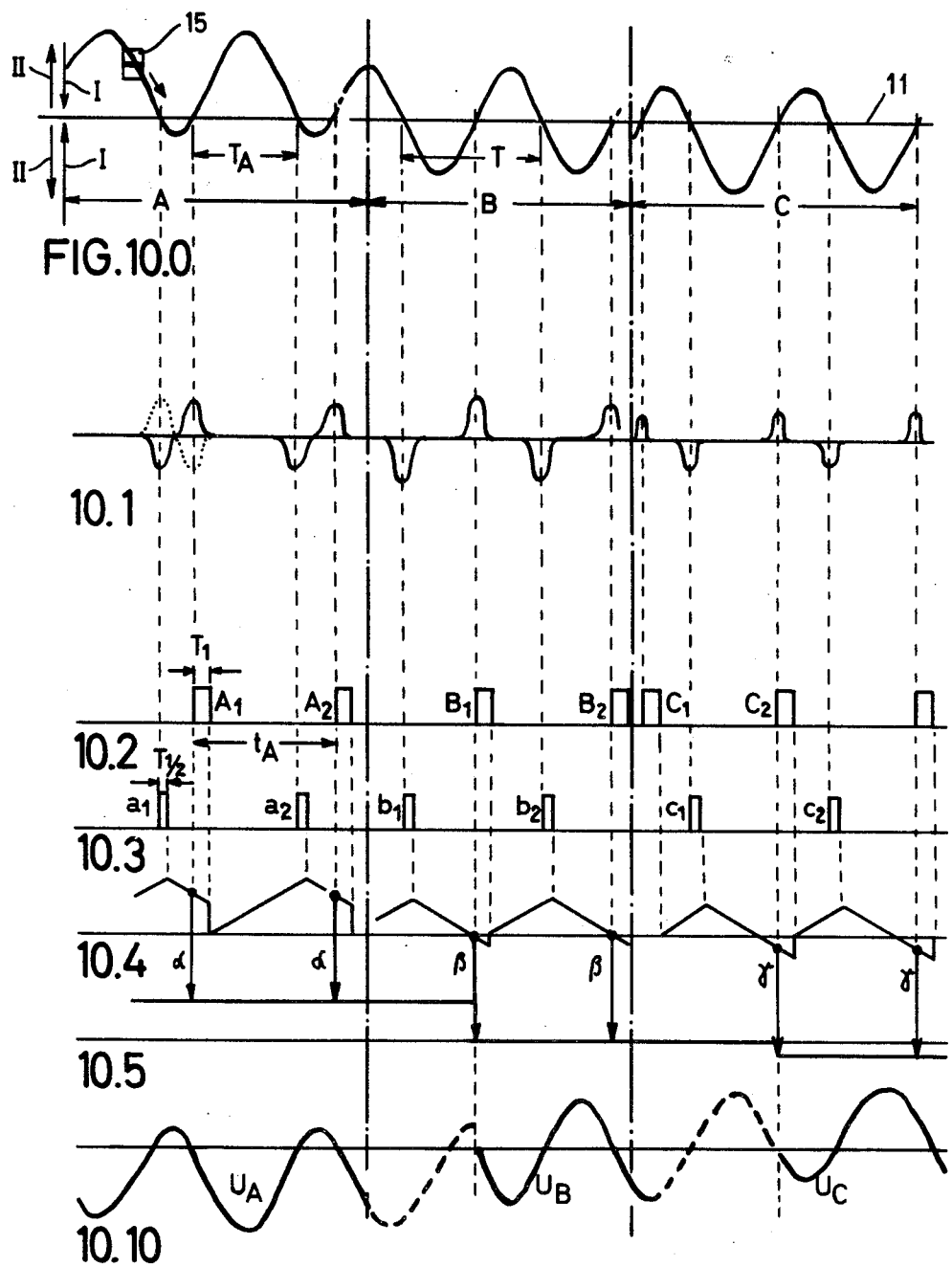

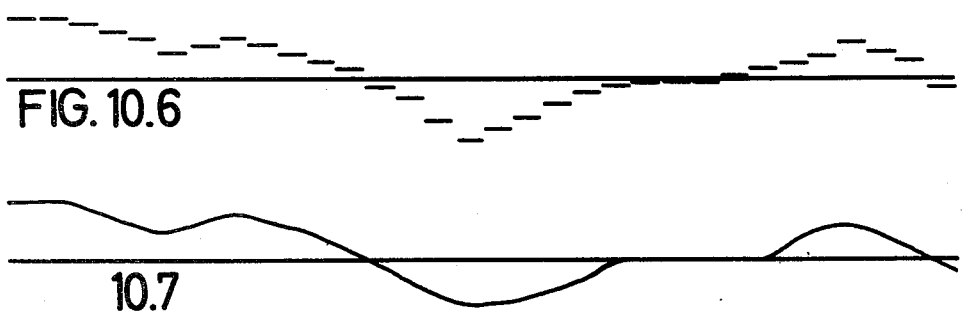
FIG. 10.6
10.7
10.8
10.9

TRACK-DEPENDENT TRANSDUCER POSITION CONTROL IN MAGNETO-DYNAMIC STORAGE DEVICES, AND A MAGNETIC RECORDING MEDIUM TO WHICH THIS METHOD IS APPLICABLE

The present application is a continuation-in-part of our copending application Ser. No. 605,412, filed Aug. 18, 1975, now abandoned.

The invention concerns a system for recording and/or reproducing data-representing signals on a magnetic recording medium, more particularly a new improved transducer locating system. The magnetic transducer is provided with an air gap for the data track and a second air gap for the reference track which latter is formed on a recording medium as a transition line between regions of different magnetization and arranged within, or laterally of, the data track. As the transducer deviates from its predetermined track position, a correction signal is produced which is fed to a locating device to which the transducer is fitted, in order to adjust the position of the transducer.

Such information as music, video signals or computer data is conventionally recorded on storage media in discrete tracks. These tracks may run longitudinally or obliquely on a recording medium or be arranged in concentric circles or in the shape of a spiral on a magnetic disc. In order to increase the data holding capacity, attempts have been made to increase the density of information longitudinally of the track and to increase also the density of the tracks themselves, i.e. the number of tracks per mm. A limit to the possible increase of track density is constituted by the reproducibility of the tracks on a mostly interchangeable recording medium and by the achievable mechanical accuracy of the transducer locating system.

While position control of the magnetic head is usually not adopted in the case of tape-like recording media, control methods and control loops are being employed for magnetic discs, in order to achieve the highest possible accuracy of transducer position control. The problem which arises with all these attempts is the question of how to produce a reference signal.

According to a known method (U.S. Pat. No. 3,534,344), for example, one side of the storage medium is used for the track-dependent control in the case of a multiple-disc pack. Here, servo tracks, as identical as possible with the desired track position, are written once and for all on the discs by the disc manufacturer. This enables a servo transducer continuously to issue signals during the subsequent employment of the storage device from which deviations of the transducer position from the desired position at a given time can be derived. The signals are used for the track alignment of the transducer system. In this disc storage system, therefore, the signals of a servo transducer control data transducers, rigidly connected thereto, on the other side of the disc. An unsatisfactory feature of this solution is the fact that one side of the storage disc has to be used wholly for accommodating servo tracks, so that its useful information capacity is lost. Another disadvantage is that the servo transducer, mechanically, is often separated from the data transducer by large distances. Mechanical stability and positioning accuracy are very important prerequisites for the satisfactory functioning of this process. A modification of this method as applied to single-disc storage systems provides for the employment of one side for the purpose of useful data and of the other side for position information.

According to another method, both useful data and position information are alternately written on one and the same track. This enables the position of the data transducer to be continuously controlled although only one surface of the recording medium is used. However, this solution still suffers from the disadvantage that part of the useful data capacity is lost and that the storage track is subdivided into a number of unalterable portion by the position information. Furthermore, the amount of electronic circuitry required for storing the position information along the path used for the useful data is considerable.

Other methods according to which the position data are derived from the useful data directly have not hitherto operated with the required reliability.

U.S. Pat. No. 3,753,252 describes a method whereby the track position is identified by magnetic and non-magnetic regions. To provide non-magnetic regions on the surface of the magnetic layer, an acid is allowed to affect selected regions. Quite apart from the obviously expensive nature of manufacturing recording media in this way, a special disadvantage is the resulting unalterable subdivision of the track which excludes the possibility of adapting the track density, and thus the capacity, to further developments in recording technology at a later date. Besides, the risk of impairment of other parts of the recording medium by the effects of the acid cannot be excluded.

U.S. Pat. No. 3,541,270 describes a magnetic head with two air gaps in juxtaposition, magnetically insulated from one another, both extending perpendicular to the direction of the track. The signals read by each head from one half of the data-bearing track are compared with one another and generate a signal for correcting the position of the magnetic head if the latter deviates from the predetermined track position. A disadvantage of this solution must be seen in the fact that transducer position control is not possible during recording. This means that known positioning methods have to be used in addition. Irregularities in the recording medium which cause signal amplitude losses, referred to as "drop-outs", and faulty pulses, referred to as "drop-ins", or signal fluctuations may lead to faulty positioning of the transducer.

Furthermore, magnetic disc and magnetic head systems with servo control are known in the case of which the inner radial part of a disc side is reserved for the servo tracks and the outer radial part for the data tracks. The system of magnetic heads allocated to these recording regions consists of a servo head and a data head (U.S. Pat. No. 3,175,205) or several data heads (U.S. Pat. No. 3,034,111) which, spaced apart from one another by a certain distance, are mounted on a common moving support. A disadvantage of these systems is that, owing to the servo region, data-recording capacity is lost if only one data head per disc surface is used or that an expensive system with several data heads per disc surface is required, in order thus to reduce the positioning range of the heads and minimize the loss of capacity and thus to reduce the radial dimension of the servo region. If in such an arrangement several data heads are mounted on one support, variations in the distance between these heads cannot be regulated by the servo-control system.

The present invention has for its object to generate continuous position information for controlling the position of the magnetic head, simultaneously with the useful information. Both types of information are to be derived in virtually the same place or in places of the storage medium spaced from each other as a result of the control lag, in order to include setting inaccuracies in the control loop and thus to compensate them. The method is also intended for application to flexible recording media.

According to the invention, these and other advantages are attained in that a reference track is formed by at least one linear transition between regions of different magnetization, arranged either within or on one side of the data track, and that at least one magnetic transducer is provided which has an air gap for the data track and a second air gap for the reference track, the transducer being supported in such a way that a reference signal can be generated by the transducer in the desired track position which is fed to a locating device and holds the transducer in alignment with the desired track, and that a correction signal is generated if the transducer is in misalignment with its desired track position which signal is fed to the transducer locating device, whereby the transducer is aligned with the track concerned.

The transducer locating control according to the invention is advantageously achieved by exploiting the space available between adjacent data tracks or within a data track, without loss of capacity for the data to be stored and with a high degree of accuracy by virtue of allocating a reference track to each individual data track and by avoiding costly mechanical coupling means between the magnetic head used for the transducer locating control and the magnetic head used for the storage of useful information. This transducer positioning system is not influenced by irregularities in the magnetic coating.

The invention will now be explained with reference to the accompanying drawings and the embodiments described below.

Figure 9:
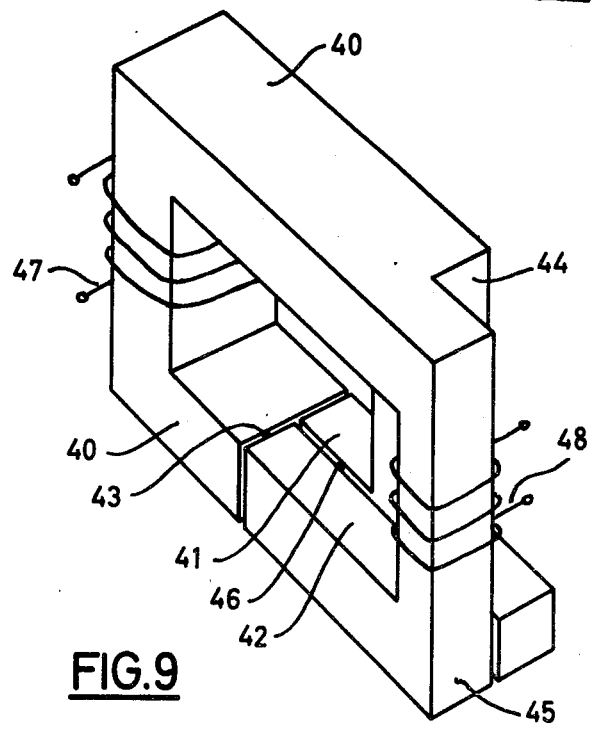
Figure 4A:
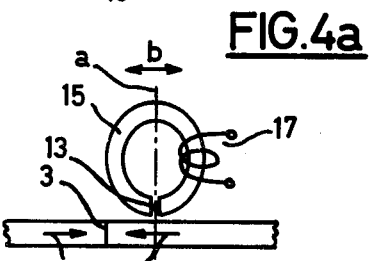
Figure 4B:
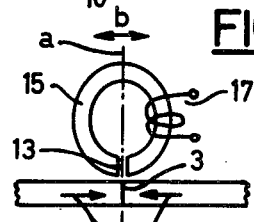
Figure 4C:
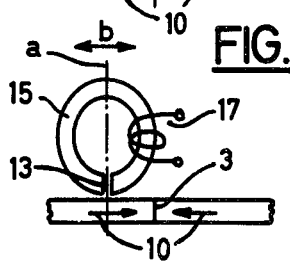
Figure 11:
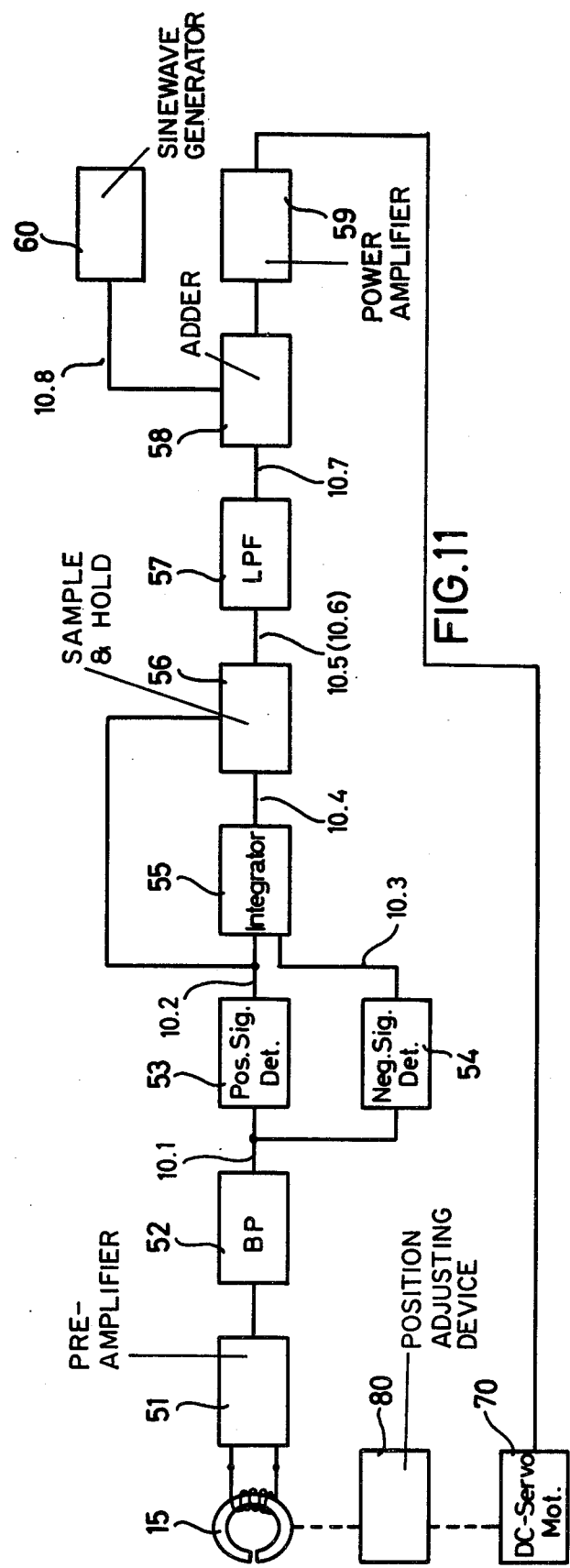

The drawings show in:

FIG. 1 in diagrammatic representation, a system of data and reference tracks on a disc-like recording medium;

FIGS. 2a to f: the magnetization characteristics, perpendicular to two adjacent reference tracks, of a recording medium;

FIGS. 3a to c: in diagrammatic representation, arrangements of a magnetic-flux sensitive transducer relative to the reference track, and the corresponding characteristics of the read voltage;

FIGS. 4a to c: in diagrammatic representation, arrangements of a flux variation sensitive transducer relative to the reference tracks;

FIG. 5 a block diagram illustrating a servo system for a transducer in a data storage disc drive, FIG. 6 a magnetic transducer with an air gap for the data track and a laterally arranged air gap for the reference track;

FIG. 7 a section of the transducer along the line II—II of FIG. 6;

FIG. 8 a section of the transducer along the line I—I of FIG. 6;

FIG. 9 a magnetic head;

FIGS. 10.0 to 10.10: diagrams, showing motion and read voltage characteristics of the transducer in FIG. 4, with a correction signal derived therefrom;

FIG. 11 a block diagram for deriving the correction signal according to FIGS. 10.0 to 10.10.

On a recording medium 1 consisting of magnetizable material, adjacent regions extending parallel to the data track 2 are magnetized differentially, after having been subjected to external magnetic fields (FIG. 1). The transition between these regions of differential magnetization forms the reference track 3 which enables accurate positioning of the write/read head above the data track and which, for this reason, is usually referred to as the "servo-track". It should be well understood that the term "recording media" refers to rigid media, e.g. magnetic storage discs, as well as to flexible recording media such as coated-foil discs.

It is an essential feature of the invention that the reference track 3, which is employed for the positioning of the transducer 11, 15, is formed exclusively by at least one variation of the magnetization by which the transducer 11,15 is affected upon its transition from one to the other of the regions forming the reference track 3. When a flux-variation sensitive transducer 15 is employed the magnetized regions themselves may be used to convey additional position information, for example in order to determine the position of the transducer 15 relative to the reference track 3 at a given time.

The differential magnetization, which characterizes the reference track 3, is achieved by different magnetic states or magnetic properties of adjacent regions, for example by magnetization differences in the direction of the flux lines;

by magnetization of different intensity;

by magnetization differing in field direction and intensity;

by magnetized and non-magnetized regions;

by magnetized and non-magnetizable regions.

The reference track 3 may obviously be formed also by two successive variations of magnetization.

The choice of the criteria of magnetic differentiation of the regions forming the reference track 3 depends essentially upon the type and design of the transducer 11,15 used for scanning, upon the properties of the recording medium and upon the track density and the position of the reference track 3 which latter may either be on one side of, i.e. adjacent to, the data track or within the latter. The arrangement within the data track would mainly be chosen if the track density no longer permits of magnetization between adjacent data tracks.

The magnetic lines of flux 4,5 of the regions forming the reference track 3 are always oriented in such a way that they can enter, via the air gap for the reference track 3 of the transducer 11,15, into the magnetic circuit of the latter.

Preferably, they run perpendicular or parallel to the reference track. However, any other orientation is feasible, given the appropriate arrangement of the air gap for the reference track 3.

If the reference track 3 is arranged within the data track 2, it is an advantage for the lines of flux 4 to run perpendicular to the data track, because there will then be a minimum of interaction between the perpendicular lines of flux of the data track and the reference track and because high selectivity can be achieved when scanning these two tracks.

The reference track 3 and the data track 2 may be recorded on a magnetic layer of uniform magnetic properties. It is an advantage, however, especially when the reference track is arranged within the data track, to establish the magnetic fields forming the reference track in those portions of a magnetic layer which have a higher coercivity than the layer portions in which data are stored, since this increases noise immunity. The layer portions of different coercivity may either by concentrated in different layers or provided in mixed arrangement in one and the same layer.

Recording media with magnetizable layers of different coercivity may be produced in a manner known per se, for example in that two magnetizable layers, separated by a thin, non-magnetizable intermediate layer, are applied successively to a support, e.g. a non-magnetic metallic disc. Preferably, it is the lower magnetic layer which has the higher coercivity and on which the reference tracks are recorded, whereas the upper magnetic layer in the vicinity of the magnetic head has the lower coercivity and is available for recording the data track. The thickness of the several magnetic layers depends upon the wavelength of the recording and is between 0.05 and 8.0 µm, preferably between 0.2 and 5.0 µm, the non-magnetizable intermediate layer having a thickness such that the magnetic layers separated by it cannot interfere with each other.

It has been found advantageous to make the coercivity of the magnetic layer for the reference track 1.3 to 5.0, and advantageously 1.5 to 3.0 times higher than that of the magnetic layer for the data track.

Disc-like supports consist of materials known per se, such as aluminum or its alloys, whereas known sheeting, preferably consisting of polyethylene terephthalate, is used for flexible recording media. Materials for the magnetizable layers may be ferromagnetic metals or metal oxides. For the layer of higher coercivity preferably ferromagnetic thin-film metal layers, especially consisting of cobalt, cobalt/iron, cobalt/nickel, cobalt/nickel/iron and also phosphorus, boron and/or nitrogen containing alloys of these metals are used. However, other suitable materials are metal oxides doped with these metals, e.g. cobalt-doped iron oxide. Where non-doped metal oxides are used, chromium dioxide is preferred. For the magnetic layer of lower coercivity, the metal oxides customary for magnetic data-recording media are being used, especially iron oxide or chromium dioxide.

For the intermediate layer, non-magnetizable materials such as aluminum or aluminum alloys and pigmented or non-pigmented polymer layers are used, which preferably have a similar composition as the magnetic layers.

Magnetic layers consisting of metal are produced by methods such as non-galvanic separation, galvanic separation or evaporation. They are known to those skilled in the art and will therefore not be described in further detail. The same applies to the coating processes for pigmented and non-pigmented polymer layers.

One possibility of recording both reference track and data track in one and the same magnetic layer having uniform magnetic properties but at different depths consists in suitably choosing the intensity of the magnetizing field and the recording density for the reference track, thus to achieve a deeply penetrating magnetization, this part of the process being followed by demagnetization of the upper part of the layer by suitable adjustment of the same parameters of the magnetizing field, in order to be able to record in this particular part of the layer the data track, by using less penetrating field parameters.

Since the recording of the reference track is in most cases performed only once, special methods may be used for this purpose:

the employment of special high-flux recording heads;

recording or contact-printing in magnetic layers (or parts thereof) of higher coercivity at a temperature higher than room temperature (thermal remanence method) and/or with a superimposed alternating field (anhysteresis method);

uniform magnetization of the entire recording medium, followed by linear erasing.

Figure 2:
Figure 2A:
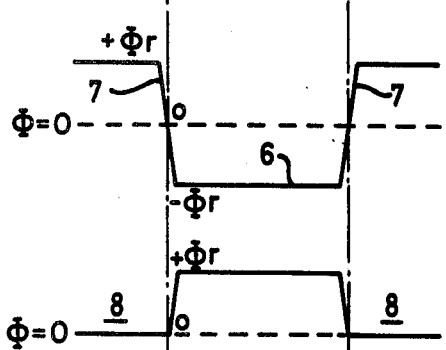
Figure 2B:

FIG. 2 shows various possibilities of magnetization, with its characteristic represented in cross-section of the recording medium, both within and between two adjacent reference tracks 3. In the case of FIG. 2a, region 6 between two reference tracks 3 is magnetized uniformly ($-\phi$). The two reference tracks themselves are formed by the steep transition 7 into a magnetizing region ($+\phi$) of opposite polarity in the adjacent region. FIG. 2b shows a derived arrangement, without magnetization in the regions denoted by the reference numeral 8.

Figure 2C:
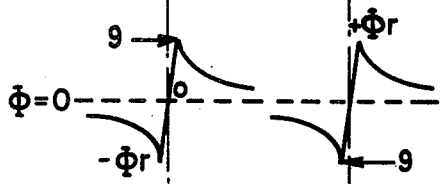
Figure 2D:
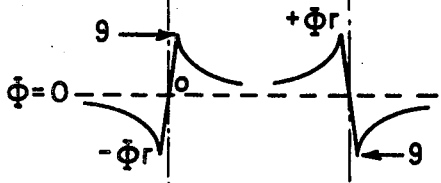

In another embodiment according to FIGS. 2c and d, the magnetization quickly decays with growing distance from the reference track from its maxima 9 of opposite polarity between which the transition forming the reference track takes place, and approaches the zero value asymptotically.

Figure 2E:
Figure 2F:
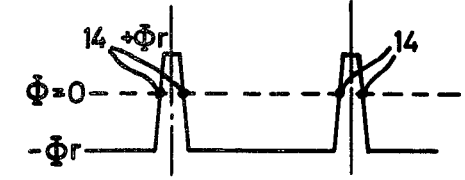

In the embodiment according to FIG. 2e, the magnetization 12 rises sharply towards the reference track and again drops sharply on the other side. According to 2f, the reference track is formed by two transitions 14 of opposite polarity.

The reference track may either be ready by means of a transducer whose read voltage is proportional to the magnetic flux (for example, a Hall generator) or by means of a transducer whose read voltage is proportional to the variation of the magnetic flux (induction principle).

FIGS. 3a to c represent three fundamental positions of a flux-sensitive transducer 11 relative to the reference track. Upon deviation from the desired track position (FIGS. 3a and c), the magnetic field 10 below the transducer generates a read voltage $U = \pm U_{max}$ whose polarity corresponds to the direction of the flux lines, and thus to the direction of the deviation. A correction signal derived from the read voltage moves the transducer in the direction towards the reference track, by means of a known locating device not shown here. When the transducer 11 is situated above the reference track 3 (FIG. 3b), the magnetic field 10 on either side of the reference track, which act upon the air gap 13 of the transducer, result in a read voltage level $U_o = 0$ V, or in any other desired voltage level X which corresponds to the desired track-related position.

When using an electro-dynamic transducer 15 according to FIGS. 4a to c, it is necessary for generating read voltage pulses (FIG. 10.3), to vary the magnetic flux in the air gap according to the induction principle by a relative movement between the reference track 3 and the air gap 13 of the transducer 15.

FIGS. 4a to c show fundamental positions indicating the alternating movements of the transducer 15. These movements may be generated, for example, by an electro-mechanical vibration system. The center positions of such a movement are indicated by a dash-dot line a. A double arrow b indicates the direction of movement. The deflection of the transducer 15 from its center position (line a) is preferably small enough for the read voltage signal scanned from the data track not to be interfered with at all, or only to a small extent. When the air gap 13 traverses the reference track 3 at which the magnetic flux 10 alters, a read voltage pulse is produced in the coil 17 of the transducer 15 whose amplitude and polarity and whose distance from the adjacent pulse depends upon the velocity and upon the phase of the transducer movement, as the reference track 3 is being traversed.

However, if the movement of the transducer 15 is such that noise is produced in the air gap picking up the useful data, then a decoupling filter network, known per se, may be used for filtering out the data signal.

The characteristics shown in FIG. 10 show, with reference to a substantially sinusoidal movement of the transducer 15 (FIG. 10.0) and to three different deviation characteristics from the reference track n in the shape of the curve in FIG. 10.7, the relationship between the several parameters of the movement and the generated correction pulses in diagrammatic representation.

The time intervals $T_A$ of the read voltage pulses are a function of the momentary position about which the transducer 15 executes movements of a predetermined amplitude, relative to the position of the reference track 3 or n. By evaluating the distances in time of the read voltage pulses of FIG. 10.1, or their amplitude, taking into account polarity, when the duration T of the periods of the movement of transducer 15 is known, a correction signal may be derived which corresponds to the amount and the direction of the deviation from the desired track-related position and can be fed to a locating device for the purpose of track-dependent transducer positioning. In FIG. 10.1 the relationship between the several positions of the transducer according to FIG. 4 and the amplitude and timing of the read voltage is illustrated diagrammatically:

FIG. 4a: Period A—Positive deviation from required position

FIG. 4b: Period B—Nought deviation with respect to required position

FIG. 4c: Period C—Negative deviation from required position

FIG. 5 is a schematic diagram of the overall disk servo arrangement. A magnetic disk being scanned by a combined read/write and servo transducer 15, which is connected to a head position control stage 16 and servo circuitry 20, which together can be referred to as the "servo loop". A further connection leads to the data read/write circuitry 50, through which the data pass on their way from or to data sources/storage means (not shown).

FIG. 11 shows the block diagram of the servo loop in more detail. Each of the circuit modules, the combination of which is shown in block form in FIG. 11, is individually known per se in the art. The coaction of the various modules of FIG. 11 will become clear from the following description of FIG. 10.

FIG. 10 shows the movement of the transducer 15 relative to the reference track n, from which the correction signal is derived according to FIGS. 10.0–10.10 as set out in the following description. Track n is an arbitrary reference track like track 3 in FIG. 1 for instance. The block diagram in FIG. 11 comprises the transducer 15 of the abovementioned combined type, the output voltage of which—generally corresponding to that of FIG. 10.1—is fed into a preamplifier 51 and thereafter is frequency-limited for the elimination of noise by a bandpass stage 52. The output voltage of the bandpass is shown in FIG. 10.1.

The polarity of the pulses shown in solid lines corresponds to the direction of magnetization I in FIG. 10.0. Dashed lines show the pulses allocated to direction II, a positive and a negative signal detector 53 and 54 being connected to the output of the bandpass 52. The output voltages of the said two stages are shown in FIGS. 10.2 and 10.3. Each of said signal detector 53 and 54 consists of a differentiator and pulse shaper stage, e.g. a Schmitt trigger having a following one-shot stage. The two signal detectors/generators 53,54 generate pulses (A, B, C) of a length $T_1$ (FIG. 10.2) and pulses (a, b, c) of a length $T_{\frac{1}{2}}$ (FIG. 10.3), respectively. The period $T_1$ is greater than the sampling time of the sample and hold circuit mentioned below.

Said two one-shot stages following said Schmitt trigger stages generate the predetermined time-shifted pulses $A_1$-$C_2$ and $a_1$-$c_2$ because they have different switching intervals $T_1$ and $\frac{1}{2} T_1$, said groups of pulses are transmitted to a common integrator 55 and a sample and hold circuit 56 (S and H circuit). In the integrator 55 a capacitor is charged (via a constant-current source for example) or discharged, so that an integrated voltage is produced which rises or falls in substantially linear manner. The output voltages of integrator 55 and S and H circuit 56 are shown in FIGS. 10.4 and 10.5. The function of the stages is described in more detail below:

The leading edges of the pulses ($A_1$, $B_1$, $C_1$) trigger the integrator 55. The precharged capacitor is discharged with the same time constant when a leading edge of one of the pulses (a, b, c) occurs. Upon occurrence of the next pulse (A, B, C) the integrator 55 is reset to 0 (zero) potential. Then the output voltage of the integrator 55 is caused to increase by precharging of the capacitor to its maximum level, i.e. until the next leading edge of a pulse (a, b, c) appears.

The voltage decrease continues until the trailing edge of one of the pulses $A_2$, $B_2$, $C_2$ appears and causes the S and H circuit to store the momentary voltage amplitude (sample). The storage period is predetermined, being the period $t_A$ between the trailing edges of two consecutive pulses A, B, C.

The stored voltage samples are shown in FIG. 10.5 as constant voltage levels which belong to a positive deviation (section A, arrows $\alpha$), to the required position (period B, arrows $\beta$) and to a negative deviation (period C, arrows $\gamma$). The sampling of the potential is effected by the capacitor which holds the sampled voltage values for a given time. The stored signal then passes a low pass filter (LPF) 57 in order to produce a continuous signal curve representing the mean deviation of the transducer 15. On a larger time scale as compared with FIGS. 10.0–5, the output voltages of the sample and hold circuit 56 and the LPF 57 are shown in FIGS. 10.6 and 10.7. The output of LPF 57 is connected to an adder 58 which has its outputs connected to a sinewave generator 60 and a power amplifier circuit 59. The output of the power amplifier 59 is connected to the input of the DC servo motor 70, which activates a position-adjusting devide (PAD) 80, also known per se in the art, for the combined transducer 15. FIGS. 10.9 and 10.10 show the DC servo motor voltage or current on a large scale and on a small scale respectively. FIG. 10.10 is a nearly accurate inverse curve of the geometrical head moving curve shown in FIG. 10.0. Specifically, the diagrams contain the following signals: FIG. 10.6 a plurality of stored amplitude levels occurring at the output of the S and H circuit. FIG. 10.7 the mean voltage - the characteristic curve for the mean deviation of the position.

A constant sinewave (FIG. 10.8) produced by the sinewave generator 60, for instance a simple transformer, and added to the signal of FIG. 10.7 results in a superimposed control voltage or current (FIG. 10.9) for the DC servo motor 70. FIG. 10.10 shows a small portion of this control voltage. The deviation of the voltages $U_A$ and $U_C$ from the voltage $U_B$ which is allocated to the required position of the transducer, as regards level and polarity corresponds inversely to the mean deviation of the transducer from the reference track n and can be directly used for the purpose of track related positional correction by means of the DC servo motor 70 and the position-adjusting device 80. The latter, which is actuated by the servo motor in the case of correction, may be for example in the form of a helical screw which mechanically adjusts the position of the transducer in a manner known in the art.

The choice of the scanning principle, i.e. for a flux-sensitive or an electro-dynamic transducer 11, 15 is influenced essentially by the position of the reference track 3 or n relative to the data track 2, and the expense contemplated for a given scanning system. The transducer 11, which operates on the principle of flux proportionality, does not require any means for executing vibratory movements, but it is more noise-sensitive to extraneous magnetic fields, especially constant fields. It should therefore be chosen predominantly for reference tracks which are arranged on one side of the data track 2.

Electro-dynamic transducers 15 have long been exclusively used, with few exceptions, in magnetic storage technology, especially in data processing peripheral storage systems. Consequently well-proven optimized manufacturing methods are generally known. There methods may be used for the purpose of track-related transducer position control according to the present invention if the relative movement between transducer 15, necessary for scanning the reference track 3, can be achieved with little expense while safeguarding the requisite positional accuracy. In disc storage systems, for example, the possibility exists, due to the available positioning drive for the transducer scanning the data tracks, of generating the vibration of the air gap for the reference track by means of an alternating voltage superimposed on the positioning signal, for example in the case of a linear motor used as a positioning drive.

The most advantageous embodiment of the transducer 11, 15 depends upon the way the reference track 3 or n or the flux lines 4, 5 which form the reference track, are arranged. Therefore, many solutions are possible. Below, only those embodiments will be described which are needed for the fundamental understanding of the present invention.

FIGS. 6, 7 and 8 show one design for the arrangement of the reference track 3 with flux lines 4 perpendicular thereto, adjacent the data track 2. In FIG. 6—viewed perpendicularly to the direction of the reference track 3—a part of the magnetic core 30 which, together with the air gap 31, forms the magnetic circuit for the data track 2, is extended to one side in such a way that a lateral magnetic circuit 32 with air gap 33 for the reference track 3 is formed as shown in sectional representation in FIG. 7. FIG. 8 shows the sections of the magnetic system along lines I—I in FIG. 6 and III—III in FIG. 7. Both these partial heads are capable of operating fully or partly independently of one another, whether they work on the flux-proportional or the flux-variation proportional principle. By modifying this design in such a way that the portion forming the magnetic circuit 32 is arranged not laterally, but on the magnetic core 30 in the direction of the data track 2, the transducer 11, 15 for a reference track 3 situated closely beside, or within, the data track 2, is obtained. It consists of three poles situated behind one another. In that case, the flux lines forming the reference track 3 run parallel with the reference track, in accordance with the orientation of the air gap. If the flux line is desired to run perpendicular to the reference track 3, logical modification of the design produces an arrangement in which two annular magnetic circuits, each forming an air gap, are perpendicular to one another.

In special cases it may be favorable to arrange, for a transducer 15 working on the flux variation sensitive principle, two separately constructed magnetic head systems, each with an air gap and both arranged on a common support such that the system which executes oscillations for scanning the reference track 3 is movably mounted on the common support and dynamically decoupled from the system serving the data track 2 by resilient damping means.

If the reference track 3 is arranged within the data track 2 it is possible to employ a transducer 11, 15 with a single air gap, provided the flux lines of the reference and the data track run more or less parallel with one another. The track position information in the shape of the direct voltage component explained earlier on in connection with FIGS. 3a to c is contained in the read signal of the transducer operating on the flux-proportional principle. The useful information is represented by an alternating voltage corresponding to the changes of the magnetic states by which the two data levels "0" and "1" are defined and which are superimposed on the direct voltage component of the track-dependent control. To separate the two signals, a filter of known type may be provided. For the arrangement of flux lines forming the reference track 3 within the data track 2, perpendicular to the longitudinal direction of the track, an advantageous embodiment of the invention provides for a transducer 15 in which the magnetic core consists of a pole piece 40 and a pole piece subdivided, parallel to the longitudinal direction of the recording track, into two halves 41 and 42. The two pole pieces—40 and 41,42 respectively—are separated by the air gap 43 for the data track 2. The air gap 46 for the reference track 3 is formed by the two pole piece halves 41 and 42. The two pole pieces 40 and 41,42 respectively are separated by the air gap for the data track 2. The two yokes 44 and 45 are provided in staggered arrangement, to enable an electro-magnetic transducer for obtaining the position information—in the present embodiment a coil 48—to be fitted to yoke 45. The magnetic circuit for the data track 2 is completed by means of the pole piece 40 with coil 47, the yokes 44 and 45, the pole piece halves 41 and 42 and the air gap 43; the circuit for the reference track by means of the pole piece halves 41, the yokes 44 and 45 with coil 48, the pole piece half 42 and the air gap 46. Both these partial heads may operate, independently of one another, either on the flux-proportional or on the flux-variation proportional principle. The accuracy of the track-dependent control is inversely proportional to the gap width of the transducer 11,15 for the reference track 3. For current track densities, the width of the air gap is therefore preferably between 1 and 50 $\mu$m, and advantageously between 2 and 20 $\mu$m.

Suitable magnetic materials for the pole pieces are soft magnetic materials such as mu-metal or ferrite, as is well known. For converting the magnetic recordings forming the reference track into signal voltages in the case of a flux variation sensitive transducer, a coil consisting of enamel-insulated copper wire, wound around a pole piece of the magnetic circuit for the reference track, is used, whereas in the case of a flux sensitive transducer a Hall generator, arranged in the magnetic circuit, effects this conversion.

As has already been pointed out earlier, the reference track 3 of the recording medium is preferably applied thereto before it is used for recording and playback purposes. Such a magnetic recording medium 1 for magneto-dynamic data storage with a reference track 3 for track-related control of the position of transducer 11,15 has, according to the invention, regions of different magnetization in and/or below the magnetic layer intended for the storage of data, the reference track 3, which can be scanned for the purpose of track-dependent control of the position of the data scanning member during recording or playback operations being formed by the substantially linear transition between these different regions.

The advantages of such a recording medium will have been gathered from the foregoing description of the invention. What we must specially emphasize once more at this point as a very simple method of applying the reference track is a suitable copying method which enables the processing of the recording media in an economic way in large-scale production. The type of reference track as such increases the value of a recording medium, as has already been explained in detail earlier on, also in view of the fact that the invention provides for a line-type, extremely space-saving form of reference track. This track-dependent transducer position control system of the invention has been tried very successfully on a series of tests and, in view of the negligible additional expense and the high reliability, must be considered a progressive contribution to magnetic storage technology.

EXAMPLE

To a disc-like aluminum support of the type used for the magnetic discs of disc-storage systems are applied a first magnetic cobalt layer of 2 $\mu$m thickness and a second magnetic iron oxide layer of the same thickness, these two magnetic layers being separated by a non-magnetic copper layer of about 10 $\mu$m thickness. The coercivity of the cobalt layer is approximately 600 Oersted, and that of the iron oxide layer about 300 Oersted. The lower (cobalt) layer has been magnetized over the entire recording range of the recording medium with concentric, closely adjacent tracks, reference tracks being formed by the transitions between these adjacent tracks and the flux lines of successive tracks being perpendicular to the reference track and opposing one another. Therefore, the width of the individual magnetized regions forming the reference tracks is equal to the distance between two adjacent reference tracks, and thus equal to the distance of the center lines of two adjacent data tracks.

During the storage of data, the data tracks can be recorded, played back and erased in the upper, iron oxide layer by using the magnetic field intensities customary in data storage on disc storage decks, without thereby erasing the magnetized regions of the reference tracks in the lower coating.

The transducer is designed according to FIG. 8, so that the reference track runs on one side of the data track. The signal voltage of the reference track is generated according to the flux-proportional principle, whereas that of the data track is generated according to the flux variation proportional principle. The width of the gap for the reference tracks is 10 $\mu$m. The width of the gap for the data track is 2 $\mu$m, in accordance with the recording density and rotational speed customary in disc storage systems.

We claim:

1. A servo arrangement for adjusting the position of transducer means relatively to a movable magnetic recording medium having an information signal track and also having, situated at least in the proximity of said information signal track, a reference track represented by a single-line-shaped transition between differently magnetized regions recorded on said medium;

said transducer means including a magnetic head system with at least one air gap which, in scanning said reference track, produces a voltage proportional to the variation of the magnetic flux in said head system; and said servo arrangement comprising means for imparting to said magnetic head system an alternating movement relatively to said reference track so as to generate a magnetic flux variation, means for deriving from said produced voltage a correcting signal indicative of a misalignment of said transducing means relatively to said reference track, and means effective in response to said correcting signal, for adjusting the position of said transducing means relatively to said reference track in a re-aligning sense.

2. A servo arrangement according to claim 1, wherein the reference track is represented by a single-line-shaped transition between magnetized regions with substantially parallel, mutually opposing flux lines extending generally parallel to the reference track.

3. A servo arrangement according to claim 1, wherein the reference track is represented by a single-line-shaped transition between magnetized regions with substantially parallel, mutually opposing flux lines extending generally perpendicular to the reference track.

4. A servo arrangement according to claim 1, wherein the reference track is represented by a single-line-shaped transition between magnetized regions of equal orientation but different field strength.

5. A servo arrangement according to claim 1, wherein the reference track is represented by a single-line-shaped transition between magnetized regions of different orientation and strength.

6. A servo arrangement according to claim 1, wherein the reference track is situated within the information signal track.

7. A servo arrangement according to claim 1, wherein the reference track is situated on one side of the information signal track.

8. A servo arrangement according to claim 6, wherein said alternating-movement-imparting means include oscillating means for deflecting said air gap across the reference track.

9. A servo arrangement according to claim 8, wherein said magnetic head system has an information air gap and a reference air gap, and wherein there are provided means for decoupling the noise signals produced in the information air gap by the deflection of the magnetic head system under the control of said oscillating means.

10. A servo arrangement according to claim 1, wherein said magnetic head system has an air gap for the information track and, located laterally off the information track, a second air gap for the reference track, said magnetic head system having three poles and two air gaps extending, in mutually perpendicular direction, between the first and second and the second and third poles, respectively.

11. A servo arrangement according to claim 1, wherein said magnetic head system has two magnetic circuits extending generally in the plane of the information track, one of said magnetic circuits having an air gap for the information track and the other having an air gap for the reference track, said magnetic circuits having three poles situated behind each other and the two air gaps extending between the first and second poles and the second and third poles, respectively.

12. A servo arrangement according to claim 1, wherein said transducer means include two separate magnetic head systems, each having an air gap and both said systems having a common support.

13. A servo arrangement according to claim 1, wherein said recording medium has a first layer for the information track and a second layer for the formation in the last-mentioned layer of magnetized regions for the reference track, said second layer having a higher coercivity than said first layer.

14. A servo arrangement according to claim 1, wherein the magnetized regions of the reference track and those of the information track have a different preferential direction of magnetization.

15. A servo arrangement according to claim 13, wherein said second layer has a coercivity which is very high in comparison with that of said first layer, and carries magnetized regions recorded therein at a temperature higher than room temperature and/or with a super-imposed alternating field.

16. A servo arrangement according to claim 1, wherein said reference track is represented by a single-line-shaped transition between regions of different magnetization recorded on said medium by magnetic copying.

17. A servo arrangement according to claim 1, wherein said reference track is represented by a single-line-shaped transition between regions of different magnetization produced by linear erasion of the uniformly magnetized recording medium.

18. A servo arrangement as claimed in claim 1, wherein said correcting signal deriving means includes means for determining the spacing between voltage pulses produced as said air gap, incident to the alternating movement of said head system, crosses the reference track.

19. A servo arrangement as claimed in claim 18,
wherein said voltage pulses include two groups of pulses, one group produced as said air gap crosses the reference track in one direction, and the other group produced as said air gap crosses the reference track in the other direction; and
wherein said deriving means include capacitive integrating means charged during the interval between a pulse of one said group and the next succeeding pulse of the other said group, and discharged during the interval between a pulse of the other said group and the next succeeding pulse of the one said group.

20. A servo arrangement as claimed in claim 19, wherein said deriving means include a sample and hold circuit for sampling the charge on said capacitive means upon occurrence of pulses of one said group, and for holding the voltage level obtained by such sampling constant until there is a change in the sampled charge.

21. A servo arrangement as claimed in claim 20, wherein said adjusting means include
an alternating voltage source;
adding means for superimposing the filtered output of said sample and hold circuit on said alternating voltage;
a servo motor connected to and controlled by the output of said adder; and
a device for adjusting the position of said transducer means, said adjusting device being operatively connected to and controlled by said servo motor.

* * * * *

UNITED STATES PATENT AND TRADEMARK OFFICE
CERTIFICATE OF CORRECTION

PATENT NO. : 4,157,576
DATED : June 5, 1979
INVENTOR(S) : Joachim Hack et al

It is certified that error appears in the above-identified patent and that said Letters Patent are hereby corrected as shown below:

IN THE DRAWINGS

FIG. 10, reference numeral "11" in the top line should read --- n ---.

Signed and Sealed this

First Day of January 1980

[SEAL]

Attest:

SIDNEY A. DIAMOND

Attesting Officer

Commissioner of Patents and Trademarks